(No Model.)
F. F. CHERRY.
PLANTER.
No. 341,452. Patented May 11, 1886.
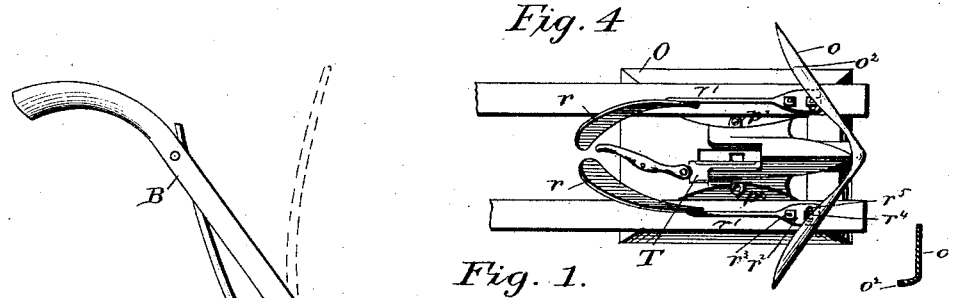
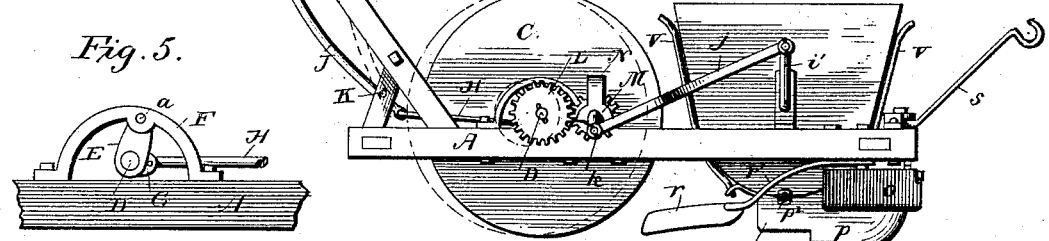
WITNESSES
J. L. Durand
Harry Y. Davis
INVENTOR
Felix F. Cherry
by Wm. H. Finckel
his Attorney

UNITED STATES PATENT OFFICE.

FELIX F. CHERRY, OF STONEWALL, NORTH CAROLINA, ASSIGNOR TO MARY F. CHERRY, OF SAME PLACE.

PLANTER.

SPECIFICATION forming part of Letters Patent No. 341,452, dated May 11, 1886.

Application filed September 5, 1885. Serial No. 176,252. (No model.)

*To all whom it may concern:*

Be it known that I, FELIX F. CHERRY, a citizen of the United States, residing at Stonewall, in the county of Pamlico and State of North Carolina, have invented a certain new and useful Improvement in Planters, of which the following is a full, clear, and exact description.

This invention has for its object the production of a machine which, by very simple and easily-made changes, may be adapted to plant corn, cotton, rice, field-peas, peanuts, millet, broom-corn, and various other kinds of seeds or grains, and to plant either in hills or drills.

The invention consists in certain details of construction and combinations of parts for effecting the object stated.

The invention is founded upon the machine forming the subject-matter of my Letters Patent No. 309,928, dated December 30, 1884.

In the accompanying drawings, illustrating my invention, Figure 1 is a side elevation. Fig. 2 is a top plan view on a larger scale. Fig. 3 is a vertical section of the hopper and its attached parts on a still larger scale. Fig. 4 is a bottom plan view of the fore end of the machine. Fig. 5 is a side elevation of the roller-shifting bearing to regulate the depth of opening. Fig. 6 is a perspective view of an agitator for use in drilling, and Fig. 7 is a longitudinal section of one of the seed cups or dies.

A is a rectangular frame of suitable construction, provided with handles B, and C is a wheel or roller provided with a shaft, D, which is journaled to rotate in blocks E, the latter being hung to swing in the arc of a circle upon pivots $a$ in semicircular bracket-bearings F, bolted to the frame A, so that by swinging said blocks upon their pivots the height of the frame may be varied with relation to the earth, and consequently the depth of furrow regulated.

To the shaft D, next the wheel or roller C, are rigidly affixed cranks G, to which are jointed rods H H, extending rearwardly and receiving a flat plate, I, which is supported by a lever, J, pivoted at K to the frame or handles. The plate I has its edge adjacent to the periphery of the roller, and serves as a scraper to keep said roller clean. By means of the lever J, rods H, and cranks G the roller may be swung upon the bracket-bearings F, for the purpose specified, and in so doing the proximity of the scraper to the roller is also, by means of the cranks, varied, to scrape more or less closely.

The moving parts of the machine are driven from the roller-shaft and interposed gearing, so that by shifting the roller the motion may be started or stopped at pleasure. Such gearing is shown in the drawings, L being a driving-pinion on the shaft D, and M a pinion on a shaft borne in a bracket, N, on the frame, and driven by said pinion L, and transmitting its motion by suitable connections, as will presently appear.

O is the hopper, of suitable shape, and preferably mounted upon the frame A, and having a bottom, P, made on the arc of a circle. The outlet R of this bottom is provided with an opening, S, and said outlet is a plate of metal, a number of which, having openings of different kinds, if desired, may be furnished with each machine. Said outlet has chamfered ends, as seen in Fig. 3, to adapt it to be dropped into place in the bottom P of the hopper. The outlet is provided with a gate, T, which is moved over said outlet, to open and close its opening more or less, by means of levers V, pivoted to the ends of the hopper, and having operating-handles readily accessible to the operator. Within the hopper and above the outlet, and conformed to and supported by the bottom, is a semicircular feeder, $b$, provided with one or more openings, $c$, to receive seed cells or dies $d$, the openings in which are made outwardly flaring. These cells are inserted in the feeder from below, and are provided with flanged and beveled edges $d'$, (see especially Fig. 7,) to make a good joint with the feeder.

Variations in the distance or space between the grains or seeds as planted may be governed by the number of cells used, the greater the number of cells open the greater the frequency of the feed, and hence when it is desired to plant the seeds far apart one or more of the cells will be closed. This is effected by using solid or dummy cells, as at $e$, Fig. 3.

The feeder $b$ is removably held in the hopper by clamps $ff$, overlapping its ends, and secured to the ends of the hopper by set-screws $g$, as shown, or otherwise. The feeder is reciprocated in the hopper over the outlet and beneath the clamps $ff$ by arms $h\,h$, secured to a hub, $h'$, which by set-screw $h^2$ is made fast to rock-shaft, $i$, having bearings in the sides of the hopper, and one end of this shaft, projecting outside of the hopper, has a crank, $i'$, (see Figs. 1 and 2,) to which is attached the pitman $j$, which extends rearwardly and is secured to a crank, $k$, on the shaft of the pinion M, said pinion being fast to its said shaft and imparting a rotary motion to its crank $k$, which in turn reciprocates the said pitman, and the latter in turn rocks the shaft $i$, carrying the arms $h$. The arms $h\,h$ in their movement serve also to agitate the contents of the hopper.

The speed, and consequently the rapidity of feed, may be regulated by change-gears, a larger or smaller pinion being substituted for the pinion L to this end. As the cells $d$ pass over the opening S, they drop their contents into the earth.

The brush $l$, secured over the feeder by an arm, $m$, attached to the hopper, insures the proper filling of the cells with seed. The making of the bottom of the hopper semicircular insures the gravitation of the seed to the point of discharge, and prevents clogging of the hopper.

When seed is to be sown in drills, a feeder having a narrow slit, as in my patent referred to, is substituted for that shown, and the arms $h$ are replaced by the agitator, Fig. 6, having staggered arms, as shown; but instead of changing feeders I may and prefer to simply place cups in all the feeder-openings, and open the outlet S to its fullest capacity by swinging back the gate T.

In the front of the frame is secured the ⌐-shaped bracket $n$, provided with the vertical slot $n'$, and to this bracket is adjustably secured the clod knocker or clearer $o$, by the bolt $o'$, engaging the slot $n'$, to provide for the setting of the knocker high or low, as the condition of the land may require. This knocker (see Fig. 4) is ⟩-shaped, and has its lower edge, $o^2$, bent back horizontally, as shown in Fig. 4, and more clearly in the section at the right of said figure, so as to prevent the knocker from sinking into the earth.

The opener $p$ is in general principle the same as in my patent referred to, but it is secured to the bracket $n$ by an eye and pin $p'$, Fig. 3, and to the bottom of the hopper by plates and bolts $p^2$, Figs. 1 and 4. The opener has the prow $p^3$ and the wings $p^4$, forming a well to cover the seed from the wind and trash.

The scrapers $r$ are reversely-curved blades, converging in the rear of the opener, (see Fig. 4,) and secured to the frame by arms $r'$, which have flattened springs loosely secured to the frame by pivot-bolts $r^3$, and these scrapers are adjustable toward and from one another by bolts $r^4$, passed through slots $r^5$, made in the arc of a circle in the flattened ends of said arms. The base of the knocker does not come clear up to the opener, and hence leaves room for loose earth next the opener which is useful to be gathered in by the coverers to successfully cover all the grain.

A hook, $s$, or other draft device, may be employed.

What I claim is—

1. The combination, with the frame and planting mechanism, of a wheel or roller for supporting the same, a shaft for said wheel, blocks in which said shaft is borne, and semicircular brackets in which said blocks are pivoted, and means to swing said blocks to raise or lower the wheel or roller, substantially as described.

2. The combination, with the frame, of a wheel or roller, a shaft for the same, bearing-blocks for said shaft, and bearings on said frame in which the said blocks are pivoted to swing back and forth in the arc of a circle, substantially as described.

3. The combination, with the frame, of a roller or wheel secured thereto by swinging bearings, crank-arms on the shaft of said wheel or roller, and rods jointed to the said crank-arms and connected to a lever for moving the wheel or roller, substantially as described.

4. The combination, with the frame and roller or wheel supported therein upon swinging bearing-blocks, of rods extending rearwardly from the shaft of said roller and connected to a scraper-plate and a lever for operating the same, substantially as described.

5. The frame, the hopper having a feeder, the rock-shaft in said hopper, a crank on the same, and a pitman extending thence rearwardly, combined with the adjustable roller or wheel, a driving-pinion on its shaft, and a driven pinion and shaft, to which latter shaft the pitman is secured, substantially as described.

6. In a planter, the hopper provided with a concave or semicircular bottom, P, having an outlet, R, and a similarly-shaped feeder, $b$, provided with cells and arranged above said bottom and removably secured therein by clamp-plates $ff$, substantially as described.

7. In a planter, the scrapers $r$, provided with arms $r'$, having the flattened spring ends $r^2$ loosely secured to the frame by pivot-bolts $r^3$ and adjustable toward and from one another by slots $r^5$ and bolts $r^4$ in their rear ends, substantially as shown and described.

8. In a planter, the opener $p$, having the prow $p^3$ and wing $p^4$, combined with the bracket $n$ and hopper-bottom, to which it is bolted by the eye and pin $p'$ and bolts and plates $p^2$, substantially as shown and described.

9. In combination with the hopper of an ordinary cotton-seed planter of the type shown, a detachable seed-dropping device arranged and operating, when in place in the hopper, to cover the discharge opening or outlet in the hopper-bottom and permit the discharge of the corn or other seed to be planted in hills through a single exit-hole, and provided with a sliding feeder arranged to operate substantially in the manner set forth.

10. In combination with the slotted bottom of the hopper and the rock-shaft of a cotton-seed planter, the detachable or removable arms, substantially as shown and described, adapted to drive or move the slide of a seed dropper or feeder arranged in connection with said slotted bottom, substantially as set forth.

11. A detachable or removable seed dropper or feeder contrivance or device, composed of a slotted outlet, R, a cellular feeder-slide, b, and the clamps f f, for holding the parts in place, the whole constructed and operating together substantially in the manner and for the purposes hereinbefore set forth.

In testimony whereof I have hereunto set my hand this 11th day of August, A. D. 1885.

FELIX F. CHERRY.

Witnesses:
FESTUS MILLER,
JAMES R. JEWELL.